United States Patent
Bemat et al.

(10) Patent No.: US 7,053,593 B2
(45) Date of Patent: May 30, 2006

(54) PROTECTION CIRCUITS FOR A DC-TO-DC CONVERTER

(75) Inventors: Mohamed Amin Bemat, Cypress, TX (US); Reynaldo P. Domingo, Spring, TX (US); Hai N Nguyen, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 53 days.

(21) Appl. No.: 10/867,457

(22) Filed: Jun. 14, 2004

(65) Prior Publication Data

US 2005/0276081 A1   Dec. 15, 2005

(51) Int. Cl.
G05F 1/40 (2006.01)

(52) U.S. Cl. .................. 323/272; 323/288; 363/65

(58) Field of Classification Search .......... 361/91.5, 361/86, 18, 91.1, 768, 685–689; 327/309, 327/321, 322, 327, 110, 180; 307/10.1, 66; 713/300–340

See application file for complete search history.

(56) References Cited

U.S. PATENT DOCUMENTS

| | | | | |
|---|---|---|---|---|
| 5,907,238 A | * | 5/1999 | Owerko et al. | 323/349 |
| 6,160,386 A | * | 12/2000 | Hemena et al. | 323/272 |
| 6,249,411 B1 | * | 6/2001 | Hemena et al. | 361/91.5 |
| 6,873,191 B1 | * | 3/2005 | Dequina et al. | 327/110 |

OTHER PUBLICATIONS

"Synchronous Rectified Buck MOSFET Drivers," Intersil HIP6601A, HIP6603A, HIP6604, Data Sheet, Jul. 2003, FN4884.4, 11 pp.
"Microprocessor CORE Voltage Regulator Multi-Phase Buck PWM Controller," Intersil HIP6302, Data Sheet, Aug. 2003, FN4766.1, 16 pp.
"Synchronous Rectified MOSFET Driver," Intersil ISL6605, Data Sheet, Aug. 2003, FN9091.2, 8 pp.

* cited by examiner

*Primary Examiner*—Rajnikant B. Patel

(57) ABSTRACT

A DC-to-DC converter comprises a first power module, at least a second power module coupled to the first power module, and a protection circuit coupled to the first and second power modules. The protection circuit causes a system power good signal to be at a state indicative of a power problem when the protection circuit detects that a switching node of one of the power modules has ceased switching.

26 Claims, 2 Drawing Sheets

PROTECTION CIRCUITS FOR A DC-TO-DC CONVERTER

BACKGROUND

A DC-to-DC converter transforms direct current ("DC") voltage from one voltage level to another. A power supply may produce a DC voltage at a first voltage level (e.g., 12 VDC). The DC-to-DC converter receives the first voltage level as an input and transforms the first voltage level to a second voltage level (e.g., 3.3 VDC) that is provided as an output of the converter. One or more loads coupled to the output of the DC-to-DC converter are powered by the converter's output voltage. DC-to-DC converters are frequently used in computer systems and numerous other types of electronic systems. Various failure modes can disrupt and even permanently damage the converter or load.

BRIEF SUMMARY

In accordance with at least some embodiment of the invention, a DC-to-DC converter (and related methods) comprises a first power module, at least a second power module coupled to the first power module, and a protection circuit coupled to the first and second power modules. Each power module comprises a switching node formed between a pair of power transistors. The protection circuit causes a system power good signal to be at a state indicative of a power problem when the protection circuit detects that a switching node of one of the power modules has ceased switching.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
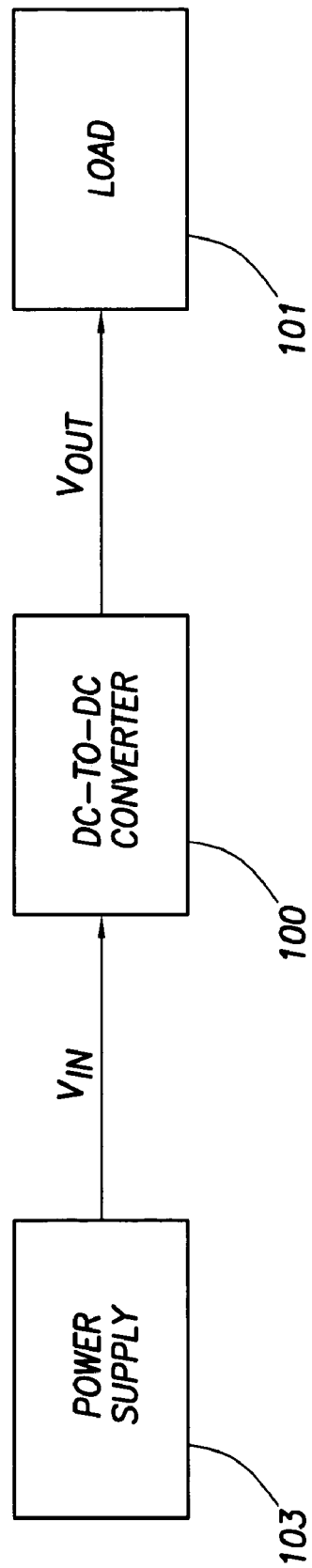
FIG. 1 shows a system comprising a DC-to-DC converter providing DC voltage for a load.

FIG. 1 shows a system comprising a DC-to-DC converter 100 coupled to a power supply 103 and to a load 101. The DC-to-DC converter 100 receives an input voltage ("VIN") and converts the input voltage to an output voltage ("VOUT") that may be used by the load. The system shown in FIG. 1 may be representative of a variety of systems such as computer systems. As a computer system, the load 101 may represent the computer system's microprocessor, memory, or other components. In some embodiments, the DC-to-DC converter disclosed herein may be embodied in a rack-based system in which the power supply 103 provides power to a plurality of converters 100 and loads 101 (e.g., servers).

Figure 2:
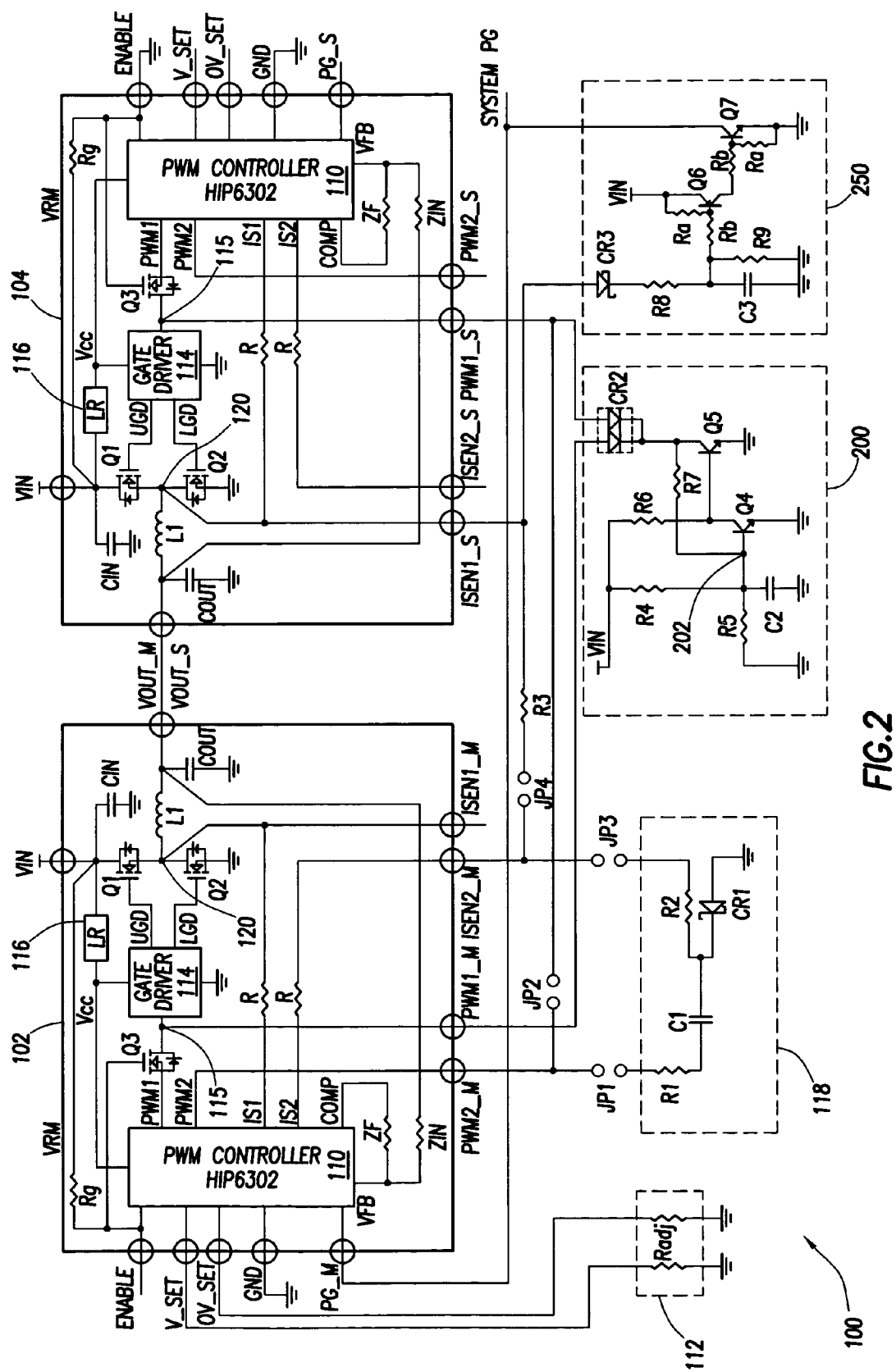
FIG. 2 shows an exemplary embodiment of the DC-to-DC converter and various protection circuits associated therewith.

FIG. 2 shows an exemplary embodiment of the DC-to-DC converter 100 of FIG. 1. The converter 100 comprises a pair of voltage regulator modules ("VRMs") 102 and 104 coupled together as shown and one or more protection circuits 200 and 250. One or more additional voltage regulator modules may be included as well. Either or both of the protection circuits 200, 250 may be included as desired to prevent or at least ameliorate the effects of one or more failure modes. The construction and operation of the DC-to-DC converter 100 will be described first followed by an explanation of the protection circuits 200 and 250.

The input voltage to the DC-to-DC converter 100 is shown as VIN at each VRM 102, 104. Each VRM is generally constructed the same as the other VRM. Each VRM comprises a pulse width modulator ("PWM") controller 110, a gate driver 114, a linear regulator 116, an inductor L1, and a plurality of resistors, capacitors, and transistors as shown and described below. In at least some embodiments, the PWM controller 110 comprise a Microprocessor CORE Voltage Regulator Multi-Phase Buck PWM Controller (part no. 6302) provided by Intersil. The gate driver 114 may comprise a Synchronous Rectified MOSFET driver (part no. 6605) also provided by Intersil.

As shown in FIG. 2, each controller 110 provides a pair of PWM output signals (labeled as PWM1 and PWM2). The PWM1 output of each controller 110 couples to a gate driver 114 via a transistor Q3. The gate driver 114 generates a pair of output gate drive signals labeled as upper gate drive ("UGD") and lower gate drive ("LGD"). The UGD drive signal is provided to transistor Q1, while the LGD drive signal is provided to transistor Q2 as shown. Transistors Q1 and Q2 comprise power transistors and may be implemented and referred to herein as metal oxide semiconductor field effect transistors ("MOSFETs"). In at least some embodiment, MOSFETs Q1 and Q2 in VRMs 102, 104 comprise 6604 and 6607 MOSFETs, respectively, provided by International Rectifier. The V_SET and OV_SET inputs to the PWM controller 110 in the VRM 102 are connected through a pair of adjustment resistors 112 to ground. Each PWM controller 110 includes an ENABLE input which is left unconnected in VRM 102 and grounded in VRM 104 in the example of FIG. 2. Each PWM controller 110 also includes a pair of sense current inputs (labeled as IS1 and IS2). The input voltage VIN connects to the drain of MOSFET Q1, linear regulator 116, and resistor Rg. The MOSFETs Q1 and Q2 are connected together with the source of Q1 connected to the drain of Q2 at a node 120. Inductor L1 connects to node 120 and to the output voltage ("VOUT") for the converter. A capacitor COUT connects between the output mode of the converter and ground. The converter 100 also includes a system power good ("SYSTEM PG") signal which may be asserted high in a no fault condition and low in a fault condition.

In at least one embodiment, the DC-to-DC converter 100 is programmable to provide an output voltage (designated as VOUT) in the range of about 1.1 VDC to about 5.1 VDC. The output voltage of the DC-to-DC converter 100 may be programmed via the adjustment resistors 112. The output voltage Vo is equal to (1.1*(Radj+1)/(1000)) Volts.

The VRMs 102, 104 can be configured either as standalone modules or in parallel. Connecting the VRMs in parallel permits higher output load currents than would otherwise be possible without the need for additional load sharing circuit. Each VRM includes a "power train" that comprises the combination of Q1, Q2, L1 and COUT. While configured in parallel, each VRM's power train is driven 180 degrees out-of-phase with respect to the other VRM. Accordingly, input and output current ripple is reduced without additional synchronizing circuits.

Each VRM converts an input voltage (e.g., +12 VDC) to a fixed or adjustable DC output voltage capable of sourcing up to the designed output load current. As shown in FIG. 2, the circuit topology used is a synchronous-buck converter in which the two MOSFETs Q1 and Q2 (also referred to as "upper" and "lower" MOSFETS respectively), connected in series across the DC input source ("VIN") and ground are driven alternately on and off in one switching cycle. The gate driver 114 receives the PWM1 signal and, based on the duty cycle of the PWM1 signal, reciprocally asserts the UGD and LGD signals in such a way that the MOSFETS Q1 and Q2 in each VRM are turned on and off out of phase with respect to each other. That is, when Q1 is turned on, Q2 is turned off, and vice versa. Further, the gate driver 114 prevents both MOSFETs Q1, Q2 from being turned on simultaneously. As a result of the oscillatory coordinated action of the MOSFETs Q1 and Q2 in each VRM, the voltage at node 120 comprises a switching waveform that varies, in at least some embodiments, from about −0.3 VDC to about 12 VDC equal to input voltage minus voltage drop across Q1 drain and source terminals at a frequency of about 500 KHz. As such, node 120 is called the "switching" node. The switching node 120 provides the switching waveform to a low pass filter comprising inductor L1 and capacitor Cout that averages the switching voltage to a desired DC output voltage.

As will be explained in greater detail below, the PWM controller 110 regulates the DC output voltage ("VOUT") by causing the duty cycle of the switching node's switching voltage to be varied in a controlled manner. The PWM controller 110 may be capable of controlling two synchronous buck channels by driving the channels 180 degrees out of phase from each other. The 180 degree phasing reduces input and output current ripple when the VRMS 102, 104 are used in parallel to deliver higher load current for a given output voltage set between 1.1V and 5.1V. To balance load current between the two power train channels and to provide over-current or overload protection, the controller 110 measures the switched current of the low side MOSFET Q2 of each channel by sensing the small negative voltage drop across the drain and source pins of Q2. Through a resistor ("R"), the voltage drop is then converted and scaled to a current that is applied through the IS1 and IS2 sense inputs to the controllers' current sensing circuit of each channel. The current is then averaged and compared to the individual channel's current and the difference then corrects the duty cycle to effect channel load balancing.

The DC-to-DC converter 100 can be configured as a two-channel, two-phase PWM controller as described above, but with just one power train channel instead of the two shown in FIG. 2. To increase power throughput, two VRMs may be connected in parallel (as shown in FIG. 2) with one VRM being a "master" and the other VRM being a "slave." In the embodiment of FIG. 2, VRM 102 is configured as the master and VRM 104 is configured as the slave. In the master/slave configuration of FIG. 2, jumpers JP1 and JP3 are removed and JP2 and JP4 are connected. The PWM controller 110 of the slave VRM 104 may be either disabled or removed entirely to prevent it from disrupting the operation of the DC-to-DC converter 100. In the embodiment of FIG. 2, the slave module's PWM controller 110 is disabled by grounding its ENABLE input signal. The small signal switch transistor Q3 in the slave module is turned off when the slave's ENABLE signal is shorted to ground. Disabling transistor Q3 isolates the slave's PWM1 signal to keep the PWM1 signal from loading the routed PWM2_M signal from the master VRM 102. This architecture allows the master VRM's PWM controller 110 to directly drive the power train channel of the slave VRM 104. In effect, the VRM with an active controller (i.e., the master) controls both VRMs 102, 104. Thus, the PWM1 signal from the PWM controller 110 of the master VRM 102 controls the gate driver 114 in the master VRM, while the PWM2 signal from the master VRM's controller is routed through jumper JP2 and controls the gate driver 114 in the slave VRM 104. Further, the current sense signal from the switching node 120 in the slave VRM is provided through resistor R3 and jumper JP4 to the master VRM's PWM controller 110 via the IS2 input, while the current sense signal from the switching node 120 in the master VRM is provided to the master VRM's PWM controller 110 via the IS1 input. Configured in this way, the converter 100 functions as a two-channel, two-phase DC-to-DC converter synchronous buck design with each channel's power train and driver circuitry provided in separate modules.

In other embodiments as noted above, the multi-phase, multiple VRM-based, DC-to-DC converter 100 can be configured to operate as a single-phase converter. To configure the converter 100 function as a single module, the PWM controller 110 in one VRM (e.g., VRM 102) is provided with an artificially generated signal on the second channel's current sense signal ("IS2") to make the controller behave like a two channel controller. The master VRM 102 is configured as a single module by connecting jumpers JP1 and JP3 and removing jumpers JP2 and JP4. The PWM controller 110 of VRM 102 outputs the out-of-phase PWM1 and PWM2 signals through the gate driver 114 to drive the power train channels. The controller 110 adjusts the individual pulse width of the PWM signals to balance the load current between the channels and to regulate the output. Because IS2 is not connected to the otherwise low side MOSFET of the non-operational other channel, leaving IS2 floating effectively disables the over-current protection because the averaging current circuit internal to the PWM controller stops working. The internal PWM controller logic causes the PWM2 signal to be driven to a maximum duty cycle of about 70%. To fool the internal PWM controller logic and to bring back the over-current protection to become active, the circuit 118 comprising R1, C1, R2 and CR1 feeds IS2 through resistor R via the ISEN2_M signal. The voltage ISEN2_M is a low-level negative voltage signal much like the negative voltage drop across the low side MOSFET Q2 of a normally operating (but now absent) power train during the off time of the switching cycle when the PWM controller samples current information. The PWM2_M output drives R1, C1, R2 and R that form a close loop circuit. Schottky diode CR1 is reversed biased and thus is off. During this time, the controller 110 does not sample the channel's load current and also charge or voltage is developed across capacitor C1. When PWM2_M transitions to a low level, the channel's current sensing circuit (in the controller 110) is triggered to sample the proportional load current. This artificially generated current is provided by CR1's negative forward voltage drop (−Vf) and is translated to an appropriately determined current through resistor R2. CR1 conducts or clamps to −Vf as the PWM2_M signal transitions to a low level because the charge across capacitor C1 discharges through CR1. Although this scheme provides an artificially fixed current, this scheme is generally sufficient to make the over-current protection circuit provided as part of the PWM controller functional and since there is no channel load balancing, the fixed current is determined only to provide adequate overload protection. The over-current limit thus can be controlled to a desired level by varying the resistance value of resistor R2.

The PWM controller 110 in each VRM may include an over-voltage protection circuit. An over-voltage condition may occur if either of the upper MOSFETs Q1 fail in the master and slave VRMs 102, 104. A failure mode of a MOSFET may result in a short circuit forming between the transistor's drain and source terminals. Protection circuit 200 may function to detect a voltage on the DC-DC converter input in excess of a predetermined threshold. When an over-voltage condition is detected on the output due to loss of feedback mechanism, the PWM controller 110 disables normal PWM operation and causes the SYSTEM PG signal to be at a state (e.g., low) indicative of the occurrence of the fault condition to the host system (e.g., load 101). When an over-voltage condition is detected on the output due to failure of Q1 by way of a short between Q1's drain and source terminals, the PWM controller 110 disables normal PWM operation and turns on Q2 ensuring that the output does not rise above an over voltage limit, thereby indicating the occurrence of the fault condition to the host system (e.g., load 101). The PWM controller continues this protection until the operating voltage stored in capacitor connected between the controller's Vcc pin and ground ("GND") pin discharges to below the operating threshold of the PWM controller. During this time, an input fuse (not specifically shown) to the VRM is subjected to high current stress causing it to open, hence isolating the output from the input. The PWM controller's over-voltage protection feature, however, may not be operational unless the controller's Vcc is at or exceeds a minimum voltage. Thus, during initialization (e.g., a power-on cycle) as Vcc (provided by linear regulator 116) ramps up (increases) from 0 volts toward a terminal voltage of, for example, 4.5 VDC, a period of time may exist in which a fault may be present but the PWM controller's over-voltage protection circuit is not yet operational. Circuit 200 functions to protect against an over-voltage condition when the PWM controller's built-in protection is not yet operational. The protection circuit 200 also protects against an over-voltage condition when Vcc falls below a threshold (e.g., during power down or a "brown out") and the PWM controller's built-in protection ceases to operate.

As shown in FIG. 2, protection circuit 200 comprises resistors R4, R5, R6, and R7, capacitor C2, transistors Q4 and Q5 and dual Schottky diode CR2. Resistors R4 and R5 form a voltage divider the input to which is Vin. A divided down voltage at node 202 is provided to the base of transistor Q4. Capacitor C2 provides filtering and couples the base of transistor Q4 to ground. The voltage Vin is provided through resistor R6 to the collector of transistor Q4 and to the base of transistor Q5. Resistor R7 connects the base of transistor Q4 to the collector of transistor Q5. The collector of transistor Q5 also connects to a packaged pair of Schottky diodes CR2 which, in turn, connect to gate inputs 115 of the gate drivers 114 as shown.

Circuit 200 provides over-voltage protection to protect the load and converter 100 against an over-voltage condition (e.g., drain and source being shorted of at least one upper MOSFET Q1 in VRM 102, 104) that may be present during power up of the converter in which the controller's over-voltage protection is not yet operational. During power up, Vin ramps up from 0 volts toward a terminal voltage (e.g., 12 VDC). The resistance values of R4, R5, and R6 are set so that the transistor Q5 turns on during power up before transistor Q4. When transistor Q5 turns on, which may occur when Vin reaches about 1 Volt, a low voltage will be present on the gate inputs 115 to the gate drivers 114. With the gate inputs grounded, the gate drivers 114 are configured to turn on lower MOSFETs Q2 and turn off or keep off upper MOSFETs Q1. Because the source terminals of MOSFETs Q2 are grounded, switching nodes 120 are forced low thereby maintaining the output voltage of the converter 100 to the load at a low voltage level. As such, during power up, voltage VOUT to the load is initially forced to a predetermined low level (e.g., 0 volts). When Vin eventually rises to a point at which the PWM controller's built-in over-voltage protection circuitry becomes operational, transistor Q4 will turn on. When transistor Q4 turns on, a low voltage will be present on the base of transistor Q5 thereby turning off transistor Q5. With transistor Q5 off, the low voltage previously forced on the gate inputs 115 of the gate drivers 114 is removed thereby permitting the VRMs 102, 104 to begin normal operation.

As explained above, during an initial portion of the power-on cycle, MOSFET Q1 is turned off and MOSFET Q2 is turned on by the gate driver 114 due to a low gate input voltage. If, however, an upper MOSFET Q1 has failed, for example, prior to the beginning of a power on cycle, the gate driver 114 will turn on Q2 as described above, but transistor Q1 will be shorted (i.e., on) due to the failure of Q1 despite an attempt by the gate driver 114 to turn off Q1. At this point, both MOSFETs Q1 and Q2 will be on sinking current from Vin to ground. As Vin rises, the current through the MOSFETs Q1 and Q2 will rise to the point at which the VRM's input fuse will protect the output of the VRM by opening up due to high current through the fuse and isolating the output from the input.

FIG. 2 shows that each VRM 102, 104 provides an output signal labeled PG_M and PG_S, respectively. Each VRM includes a power good detect circuit that controls the respective PG output signal depending on whether a problem exists with the VRM. In some embodiments, a power good signal is set high to indicate the lack of a problem (e.g., partially non-operational VRM) and low to indicate the existence of a problem. A signal labeled SYSTEM PG is controlled by VRM 102 as an indication of the power state of the system 100 and may be monitored by a host system (e.g., load 101). A high SYSTEM PG signal thus may indicate that the converter 1 is fully operational while a low SYSTEM PG signal may indicate at least one of the VRMs (e.g., the slave VRM 104) is not fully operational.

Protection circuit 250 functions to detect when the slave VRM 104 malfunctions and pulls the SYSTEM PG signal low to indicate such a malfunction. A malfunction that the circuit 250 detects may include a cessation of switching by the slave VRM 104. Because the slave VRM's PWM controller 110 is not enabled, its power good detect circuit, which detects a problem with the operation of the VRM) is also disabled. Only the master VRM's PG circuit is active which permits the master VRM to set the SYSTEM PG signal to a state indicative of an absence of a power problem as long as the output voltage Vout from the master VRM is within regulation. As such, when a fault occurs where the slave VRM's power train channel stops switching because of, for example, the loss of the PWM2_M signal from the master VRM, the PG_M output signal from the master VRM 102 (and thus the SYSTEM PG signal) continues to be set at a state indicating lack of a fault because the master VRM continues to regulate the output voltage although overloaded to twice the load current because the slave VRM is "dead." As such, the SYSTEM PG signal continues to indicate a problem free situation.

As explained above, during normal operation of the slave VRM 104, the voltage on switching node 120 comprises a switching waveform. In one embodiment, for example, the switching waveform may comprise a voltage that switches between about −0.3 VDC and about 12 VDC at a frequency of about 500 KHz. If the slave VRM 104 ceases switching (due to a malfunction), the voltage on node 120 becomes a DC voltage level approximately equal to approximately the output voltage programmed for the load being driven by the converter 100. Protection circuit 250 addresses the problem of ensuring that the SYSTEM PG signal is controlled to a state to indicate a power problem to the host system when the slave VRM 104 ceases operating even though the master VRM 102 continues operating normally. As explained below, circuit 250 is configured to differentiate between the normal operating condition (e.g., 500 KHz, 0 to 12 VDC switching waveform on node switching 120) and the failure mode (e.g., constant DC voltage on switching node 120).

Circuit 250 comprises resistors R8 and R9, capacitor C3, Schottky diode CR3, and transistors Q6 and Q7. The combination of components R8, R9 and C3 form an averaging circuit that filters the switching waveform received from node 120 of the slave VRM 104. The filtered switching waveform may be used to reverse bias transistor Q6's base-emitter connections with the appropriately sized built-in resistors Ra and Rb to ensure transistor Q6 remains off during problem-free operation (e.g., sufficiently operational VRM 104). In at least one embodiment, transistor Q6 will remain off as long as the input voltage on Q6 is at least about 11.4 volts. Thus, the component values of R8, R9 and C3 are such that the base voltage of Q6 is at least 11.4 volts during normal switching operation of the slave VRM 104 (i.e., 500 KHz, 0 to 12 VDC switching waveform on node switching 120). With transistor Q6 off, transistor Q7 is forced off. Transistor Q7 with its own built-in bias resistors drives the system PG signal and also connects to an open collector transistor inside the PWM controller 110 in the master VRM 102.

When a fault condition occurs (e.g., switching at the slave VRM ceases thereby reducing the voltage on switching node 120 to the programmed output voltage), the voltage on the base of Q6 will be less than the voltage necessary to keep transistor Q6 off. As a result, transistor Q6 turns on thereby also driving transistor Q7 to an on state. With transistor Q7 in an on state, the SYSTEM PG signal is pulled low, thereby indicating the fault condition to the host system. Schottky diode CR3 functions to isolate the averaging circuit (R8, R9, and C3) and helps avoid falsely turning on transistor Q6.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A DC-to-DC converter, comprising:
a first power module;
at least a second power module coupled to the first power module;
a protection circuit coupled to the first and second power modules;
wherein each power module comprises a controller and first and second power transistors that reciprocally turn on an off, wherein the second power transistor coupled between a switching node and ground in each power module, and wherein the protection circuit forces at least one of the second power transistors to be on during at least a portion of time while an input voltage to the DC-to-DC converter is below a threshold.

2. The converter of claim 1 wherein, once an input voltage reaches a threshold value, the protection circuit releases the at least one second power transistor from being forced on.

3. The converter of claim 1 wherein the protection circuit forces the at least one second power transistor to be on at least until over-voltage protection circuitry in the controller in each module is operational.

4. The converter of claim 1 further comprising a gate driver in each in power module, each gate driver coupled to the controller and the pair of power transistors in the respective power module and to the protection circuit, and the protection circuit forces the input of the gate driver to logic low level to force the second power transistor in each power module to be on while the input voltage is below the threshold.

5. The converter of claim 1 further comprising a second protection circuit coupled to the first and to the second power modules, the second protection circuit causes a system power good signal to be at a state indicative of a power problem when the second protection circuit detects that a switching node of one of the power modules has ceased switching.

6. The converter of claim 1 wherein the protection circuit forces at least one of the second power transistors to be on during at least a portion of time while the input voltage is rising, yet below the threshold, during an initialization.

7. A DC-to-DC converter, comprising:
a first power module;
at least a second power module coupled to the first power module;
a protection circuit coupled to the first and second power modules;
wherein each power module comprises a switching node formed between a pair of power transistors, and wherein the protection circuit causes a system power good signal to be at a state indicative of a power problem when the protection circuit detects that a switching node of one of the power modules has ceased switching.

8. The converter of claim 7 wherein the protection circuit comprises an averaging circuit that produces a voltage indicative of an average voltage of a switching waveform in one of the power modules, said voltage used to control a transistor that causes the system power good signal to be controlled to indicate the presence or absence of a power problem.

9. The converter of claim 7 wherein the first power module controls the system power good signal depending on whether the first module is operational, and the protection circuit causes the system power good signal to be at a state indicative of a power problem if the second module is non-operational.

10. The converter of claim 7 further comprising a second protection circuit that forces an output voltage of the converter to be low during at least a portion of time while the DC-to-DC converter is powering up.

11. The converter of claim 10 wherein the second protection circuit forces the output voltage to be low at least until over-voltage protection circuitry in each module is operational.

12. A system, comprising:
a load; and
a DC-to-DC converter coupled to said load, said converter comprising at least a first power module, a second power module, and a protection circuit coupled to the first and second power modules, wherein the protection circuit forces an output voltage of the DC-to-DC converter to be a predetermined low level during at least a portion of time while an input voltage to the DC-to-DC converter is below a threshold.

13. The system of claim 12 wherein the DC-to-DC converter forces the output voltage to the predetermined low level at least until over-voltage protection circuitry in DC-to-DC converter is operational.

14. The system of claim 12 wherein the DC-to-DC converter comprises first and second power modules and a protection circuit coupled to the first and second power modules, and wherein the first power module controls a system power good signal to the load depending on whether the first module is operational, and the protection circuit also controls the system power good signal depending on whether the second module is operational.

15. A system, comprising:
a load; and
a DC-to-DC converter coupled to said load, said converter comprising at least first and second power modules and a protection circuit coupled to the first and second power modules, wherein the protection circuit causes a system power good signal to beat a state indicative of a power problem when the protection circuit detects that a switching node of one of the power modules has ceased switching.

16. The system of claim 15 wherein the converter comprises a second protection circuit that forces an output voltage of the DC-to-DC converter to be low during at least a portion of initialization of the DC-to-DC converter.

17. The system of claim 15 wherein the load comprises a microprocessor.

18. A DC-to-DC converter, comprising:
first means for Providing power and, once an input voltage has reached a threshold level, for providing over-voltage protection;
at least a second means for providing power and, once the input voltage has reached the threshold level, for providing over-voltage protection; and
means for forcing an output voltage of the first and second means for providing power to be low while the input voltage is below a threshold until the first and second means provide over-voltage protection.

19. The DC-to-DC converter of claim 18 further comprising means for monitoring an average voltage level of a switching waveform in the second means for providing power and for controlling a system power good signal based on said average voltage level.

20. A DC-to-DC converter, comprising:
first means for providing power and for controlling a system power good signal;
at least a second means for generating a switching waveform and for providing power; and
means for receiving the switching waveform from the second means, for filtering the received switching waveform, and for controlling the system power good signal based on the filtered switching waveform.

21. The converter of claim 20 further comprising means for forcing an output voltage of the first and second means for providing power to be low during at least a portion of an initialization of the DC-to-DC converter.

22. A method, comprising:
converting an input DC voltage to an output DC voltage by a plurality of voltage regulator modules;
after the input DC voltage has reached a threshold level, providing over-voltage protection in said voltage regulator modules;
forcing the output DC voltage from the voltage regulator modules to be low during an initialization process at least until the voltage regulator modules provide over-voltage protection.

23. The method of claim 22 further comprising filtering a switching waveform and controlling a system power good signal based on the filtered switching waveform.

24. A method, comprising:
converting an input DC voltage to an output DC voltage by a first voltage regulator module;
controlling a system power good signal by said first voltage regulator module;
generating a switching waveform in at least a second voltage regulator module;
converting the input DC voltage to an output DC voltage by said second voltage regulator module;
receiving the switching waveform from the second voltage regulator module;
filtering the received switching waveform; and
controlling the system power good signal based on the filtered switching waveform.

25. The method of claim 24 wherein controlling the system power good signal based on the filtered switching waveform comprises setting the power good signal to a state indicative of an absence of a power problem if the filtered switching waveform is indicative of an operational second voltage regulator module.

26. The method of claim 24 wherein controlling the system power good signal based on the filtered switching waveform comprises setting the power good signal to a state indicative of a power problem if the filtered switching waveform indicates improper operation of the second voltage regulator.

* * * * *

UNITED STATES PATENT AND TRADEMARK OFFICE
CERTIFICATE OF CORRECTION

| | |
|---|---|
| PATENT NO. | : 7,053,593 B2 |
| APPLICATION NO. | : 10/867457 |
| DATED | : May 30, 2006 |
| INVENTOR(S) | : Mohamed Amin Bemat et al. |

Page 1 of 1

It is certified that error appears in the above-identified patent and that said Letters Patent is hereby corrected as shown below:

In column 9, line 43, in Claim 15, delete "beat" and insert -- be at --, therefor.

In column 9, line 54, in Claim 18, delete "Providing" and insert -- providing --, therefor.

Signed and Sealed this

Fourth Day of August, 2009

JOHN DOLL
*Acting Director of the United States Patent and Trademark Office*